United States Patent [19]

Pridham et al.

[11] 4,290,127

[45] Sep. 15, 1981

[54] BEAMFORMER WITH REDUCED SAMPLING RATE

[75] Inventors: Roger G. Pridham, Providence, R.I.; Ronald A. Mucci, Westwood, Mass.

[73] Assignee: Raytheon Company, Lexington, Mass.

[21] Appl. No.: 99,386

[22] Filed: Dec. 3, 1979

[51] Int. Cl.³ .................................... G01S 3/82

[52] U.S. Cl. .................................... 367/123; 343/100 SA

[58] Field of Search .................................... 367/123, 126; 343/100 SA

[56] References Cited

U.S. PATENT DOCUMENTS

| | | | |
|---|---|---|---|
| 4,107,685 | 8/1978 | Martin et al. | 343/100 SA |
| 4,166,999 | 9/1979 | Brady | 367/123 X |

*Primary Examiner*—Richard A. Farley

*Attorney, Agent, or Firm*—Martin M. Santa; Joseph D. Pannone

[57] ABSTRACT

A beamformer for an array of sonar transducers, or electromagnetic radiating elements, includes mixers for translating the signals received by the transducers to a lower frequency. The beamformer incorporates delay lines operating at a clock rate which is reduced in proportion to the decrease in frequency. Each delay line provides delays to the signals of corresponding ones of the transducers in accordance with the time of arrival of a wavefront of radiation upon the respective transducers. Phase shifters coupled between the mixers and the delay lines impart phase shifts to the transducer signals proportional to the respective delays to compensate for the lowering of the frequency.

6 Claims, 5 Drawing Figures

BEAMFORMER WITH REDUCED SAMPLING RATE

BACKGROUND OF THE INVENTION

This invention relates to beamformers for use with an array of sonar transducers or electromagnetic radiating elements and, more particularly, to a beamformer operating at a reduced sampling rate.

Beamformers are used with arrays of sonar transducers for transmitting and receiving beams of sonic radiation. Similarly, beamformers are also used with arrays of electromagnetic radiating elements for transmitting and receiving beams of electromagnetic radiation. In the case of the forming of a receiving beam of radiation, the beamformer introduces temporal delays or phase shifts between the signals received from respective ones of the transducers or radiating elements in accordance with the differing times of arrival of a wavefront of radiation at the respective ones of the transducers or radiating elements in the array. Typically, phase shifters have been employed in radar systems utilizing an array antenna since the required sampling rates for the use of digital delay lines would be in excess of the capabilities of present day electronic circuits because of the relatively high carrier frequencies employed in most radar systems. In the case of sonar systems, wherein the carrier frequency of the radiation is substantially lower than that of radar systems, digital delay lines are frequently employed with the signals at the respective transducers being sampled at rates which are many times higher than the highest frequency of the sonic radiation to minimize the effects of temporal quantization in the beamforming process. By way of example, it has been found that the sampling of transducer signals at intersample intervals which are less than approximately one-tenth of a period of the radiation permits the formation of a receiving beam with substantially the same accuracy as can be provided at higher sampling rates. In a typical sonar operating at a sound frequency of ten kilohertz (kHz), the sampling rate of the signals of individual ones of the transducers would be at a rate of approximately 100 kHz. A sonar system employing the sampling of transducer signals and utilizing the delay lines for delaying the signal samples to produce a beam of radiation is disclosed in the U.S. Pat. No. 4,107,685 which issued in the name of Walter J. Martin et al on Aug. 15, 1978. While the use of digital sampling by analog-to-digital converters is disclosed in the aforementioned Martin patent, it is to be understood that sampling by means of sample-and-hold circuits followed by registers of charged-coupled devices (CCD)'s serving as the delay lines may also be employed.

A problem arises in that a high sampling rate necessitates the storage of many samples of the transducer signals, or signals of the radiating elements in the case of an electromagnetic system. Furthermore, the number of samples to be stored increases with the number of transducers in the array. And, as can be seen in the case of electromagnetic systems, the required sampling rate is so high as to preclude the use of digital delay lines in the systems operating at carrier frequencies above approximately 100 megahertz (MHz) with present technology. In systems of limited signal bandwidth, such as a sonar signal or radar signal having a bandwidth less than approximately ten percent of the carrier frequency, beamforming can be accomplished at the carrier or at intermediate frequencies (IF) by means of phase shifters. The beamforming operation by means of delay lines is applicable to both narrow and wide band signals. However, the beamforming operation by means of delay lines cannot be directly accomplished at IF because, during the translation of the carrier frequency to a lower frequency, there has been an alteration in the relationship between the period of the signal and the differences in the times of arrival of the wavefront upon the respective transducers of the array.

Since the invention is equally applicable to a beamformer operating with an array of sonar transducer elements and a beamformer operating with an array of electromagnetic radiating elements, the ensuing description of the invention is facilitated with reference to a beamforming operation utilizing only sonar transducers. However, it is to be understood that the terminology of transducer is to include the electromagnetic radiating element when the beamformer is to be incorporated in an electromagnetic system.

SUMMARY OF THE INVENTION

The aforementioned problems are overcome and other advantages are provided by a beamformer which is coupled to an array of transducers for combining the signals of the transducers to form a beam. In accordance with the invention, the beamformer includes a set of mixers which are coupled to individual ones of the transducers to mix the transducer signals with reference signals, thereby translating the transducer signals to a lower frequency. In addition, in accordance with the invention, the beamformer includes a set of phase shifters which are coupled to output terminals of the respective mixers to introduce a phase shift to each of the respective transducer signals. The amount of phase shift applied is dependent on the frequency of the reference signal, and independent of the frequency of the transducer signals, so that the phase shift operation does not impose a limitation on the bandwidth of transducer signals which can be processed by the beamformer. Thereupon, the transducer signals are coupled to a set of delay lines which impart delays to individual ones of the transducer signals in accordance with the times of arrival of a wavefront of radiation upon the transducers, differences in the times of arrival depending on the relative positions of the transducers in an array of the transducers. The magnitudes of the phase shifts imparted by the phase shifters are coordinated with the magnitudes of the delays imparted by the delay lines so that the phase shifts are proportional to the delays in order to compensate for the lowering of the frequency of the transducer signals. The delayed transducer signals are then summed together to form the desired beam.

The introduction of the compensating values of phase shift to the respective transducer signals makes possible the utilization of the delay line configuration of beamformer with the transducer signals at the lowered frequency. Thus, since the period of the sinusoidal waveform of the transducer signal, or quasi-sinusoidal signal in the case of a relatively wide bandwidth sonar signal, is enlarged, the intersample interval between samples of the transducer signals may be increased while the fidelity of the radiation pattern of the beam is preserved. Accordingly, sampling circuits are coupled between the output terminals of the mixers and the input terminals of the phase shifters to provide samples of the transducer signals. The samples of the transducer signals are then coupled via the phase shifters to the delay lines. It is recognized, that the translation of the transducer signals to a lower frequency necessitates consideration as to spectral foldover or alaising, in the event that the signal bandwidth is to be translated to base band. Accordingly, inphase and quadrature mixing and sampling of the transducer signals is employed to fully reconstruct the signal spectrum upon translation of the signal to base band. Preferably, the sampling is accomplished by analog-to-digital converters which are strobed by a timing circuit which also operates the delay lines. Thereby, the increments of delay are multiples of the intersample interval.

To provide several directions of the beam which is formed by the beamformer, a memory such as a read-only memory is incorporated into the beamformer for providing a set of delay command signals for each of the respective directions of the beam. The delay lines are responsive to the delay command signals for providing corresponding amounts of delay to the transducer signals. In addition, a memory which is addressed by the delay command signals is provided for activating the phase shifters to provide the requisite phase shifts to compensate for the lowered frequency. As a practical matter in the implementation of the phase shifters, in the case of the foregoing sampled data system wherein the samples are provided by analog-to-digital converters, it is convenient to provide the phase shift function by a set of multipliers wherein the samples of the transducer signals are multiplied by phase shift factors obtained from the foregoing phase shift memory.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
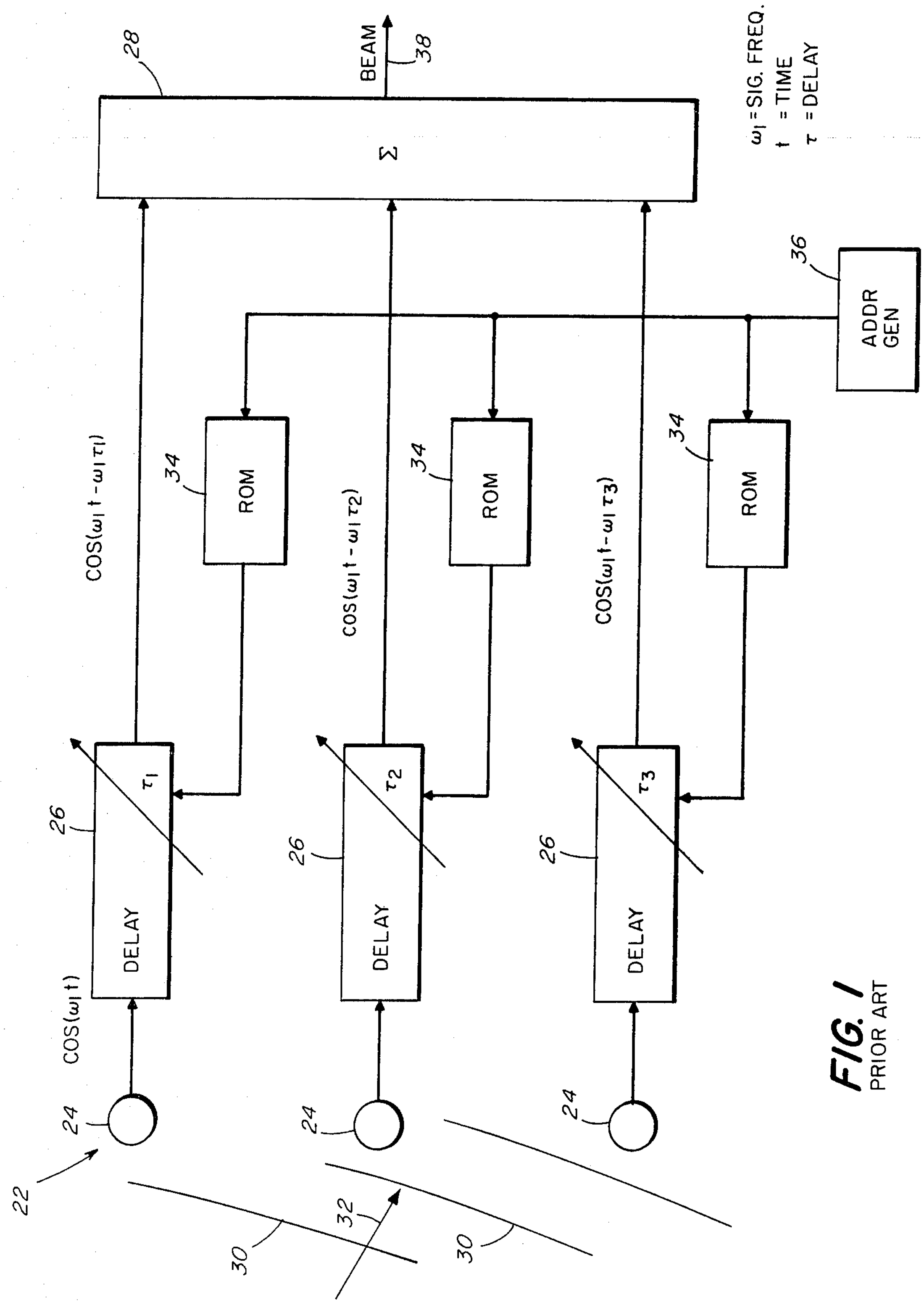
FIG. 1 PRIOR ART
FIG. 1 is a block diagram of a system of the prior art showing the signals which are present in a beamformer employing delay lines.

Referring now to FIG. 1, there is seen an exemplary beamforming system 20 of the prior art. The system 20 is seen to comprise an array 22 of transducers 24, three such transducers 24 being shown by way of example, it being understood that many more transducers 24 may be utilized in the array 22. Individual ones of the transducers 24 are coupled via delay lines 26 to the input terminals of a summer 28 which sums together the signals of the respective transducers 24, the signals being delayed by the delay lines 26 by amounts of delay corresponding to the differences in times of arrival of a wavefront 30 upon the respective transducers 24. The wavefronts 30 are understood to be the wavefronts of a sound wave propagating towards the array 22 in the direction of an arrow 32. While known circuit elements, such as amplifiers which are coupled between the transducers 24 and the delay lines 26, have been deleted to simplify the figure. Memories 34, which may be read-only memories, are coupled to the respective delay lines 26 for varying the delays in accordance with the direction in which a beam is to be formed. A generator 36 addresses the memories 34 in accordance with the desired angle of the beam, the beam signal appearing at the output terminal of the summer 28 on line 38. The symbols for the frequency $\omega$ of the transducer signal, for time t, and for a delay $\tau$ imparted by a delay line 26 as shown in the figure. The mathematical expressions for the signals at the output terminals of the delay lines 26 are also shown in FIG. 1, these mathematical expressions being of interest in that they are altered by the introduction of an intermediate frequency as will be seen with reference to FIG. 2.

Figure 2:
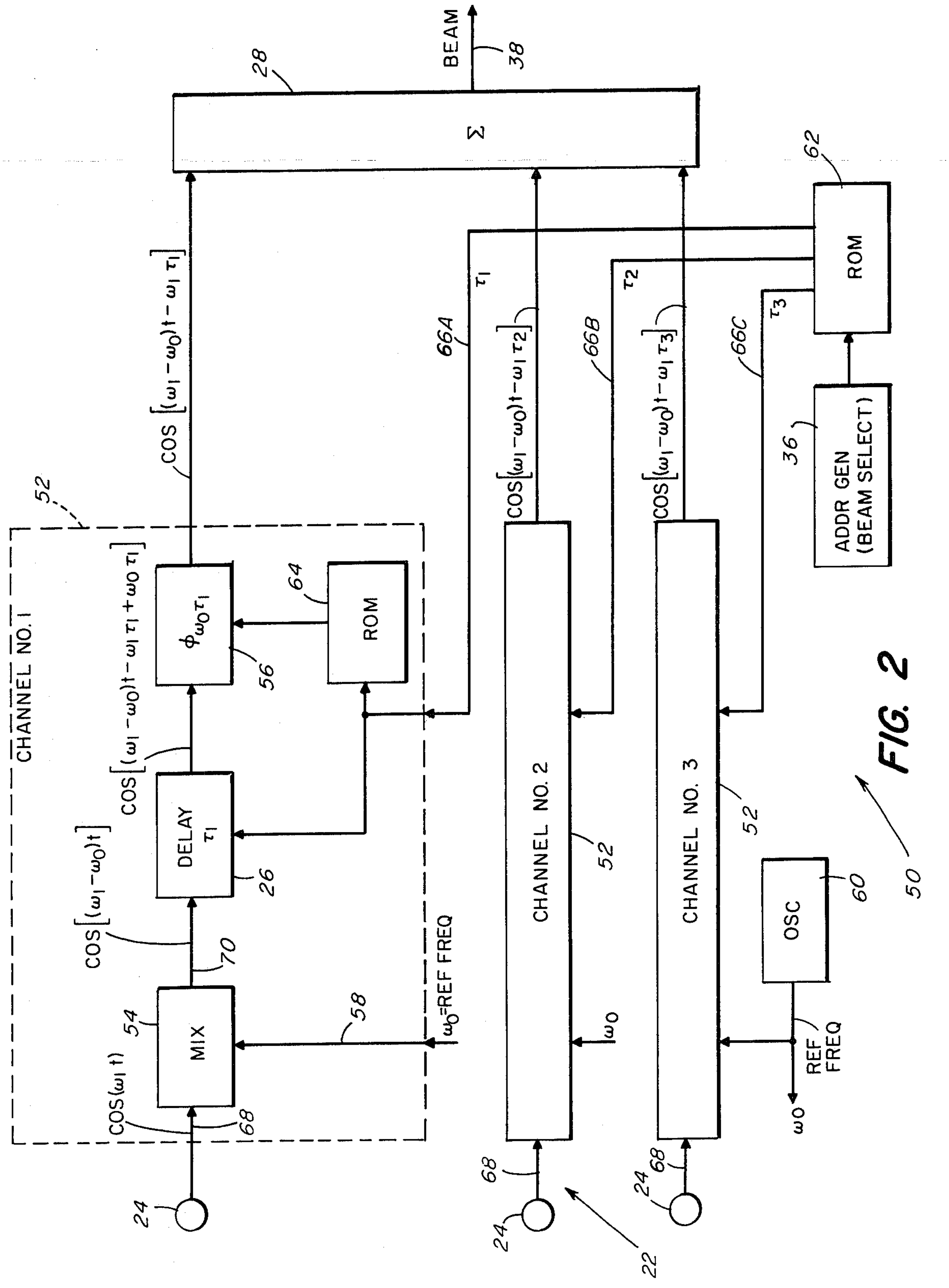
FIG. 2 is a simplified block diagram of a beamformer, in accordance with the invention, which is seen to have three channels coupled respectively to three radiating elements, each of the channels incorporating a phase shifter for imparting a phase shift which cancels a term in the mathematical expression seen at the output of a delay line in the respective channel.

Referring now to FIG. 2, there is seen a simplified representation of a beamforming system 50 which comprises a set of signal channels 52 coupled to respective ones of the transducers 24. In accordance with the invention, each of the channels 52 comprises a mixer 54 and a phase shifter 56 in addition to the delay line 26 and the memory 34 of FIG. 1. With reference to the mathematical expressions appended to the lines at the output terminals of the delay line 26 and the phase shifter 56, it is noted that the order of the signal processing by the delay line 26 and the phase shifter 56 may be interchanged. As will be seen subsequently with reference to FIGS. 3 and 4, the phase shifter 56 of the preferred embodiment of the invention is coupled between the mixer 54 and the delay line 26 in each signal channel 52. However, in order to demonstrate the correction term introduced by the phase shifter 56, the simplified diagram of FIG. 2 shows the phase shifter 56 following the delay line 26.

As will be described subsequently with reference to FIG. 4, the phase shift term introduced by the phase shifter 56 is accomplished digitally by multiplying a sample of the signal of a transducer 24 by a phase shift factor, the operation of the multiplier being independent of the frequency of the transducer signal thereby insuring that the phase shift function can be accomplished while retaining the bandwidth of the transducer signal. Thereby, the signal bandwidth of the system 50 can be as large as the signal bandwidth of the system 20 of FIG. 1 even though a phase shift correction term has been introduced as shown in the mathematical expressions. Furthermore, it is noted that the magnitude of the phase shift term is independent of the frequency of the transducer signal, the magnitude of the phase shift term being dependent only on the frequency of a reference signal applied along line 58 to the mixer 54 by an oscillator 60, and upon the magnitude of the delay introduced by a delay line 26.

In FIG. 2, the operation of the three memories 34 of FIG. 1 has been combined into that of a single memory 62. In addition, the channels 52 comprise memories 64 which are addressed by the delay command signals on the lines 66, individual ones of the lines being further identified by the legends A-C. Thereby, since the delay line 26 and the memory 64 of a channel 52 are addressed by the same signal, the memory 64 directs the phase shifter 56 to provide the phase shift term which compensates for the delay introduced by the delay line 26.

With reference to both FIGS. 1 and 2, and with reference to the mathematical expressions appended to the output terminals of the respective delay lines 26, there is seen a delay term which is equal to the product of a frequency times a delay increment. The frequency in the delay term is the frequency of the signal of the respective transducer 24, while the delay increment is the amount of delay imparted to the transducer signal by the respective delay line 26. The mathematical symbol for the delay increment includes a subscript identifying the corresponding channel 52.

Upon comparing the mathematical expressions of FIGS. 1 and 2, it is seen that the output signal of the delay line 26 of FIG. 2 includes an extraneous term equal to the product of the delay increment times the reference frequency on line 58. The extraneous term is brought about in the system 50 by virtue of the operation of the mixer 54 which translates the frequency of the transducer signal to IF. Upon removal of the extraneous term by the phase shifter 56, the mathematical expressions at the input terminals of the summers 28 in both FIGS. 1 and 2 are seen to contain the same delay terms, and are seen to be equal apart from the frequency translation. Thereby, it is seen that the translation of the transducer signal on line 68 to a lower frequency on line 70, whether the lower signal on line 70 be an IF signal or a base band signal, can be accomplished by the system 50 without any dimunition in the accuracy of the beamforming process. The accuracy of the beamforming operation is retained with each beam direction that is selected by the address generator 36 since, upon an addressing of the memory 62 to provide the requisite delays in each of the channels 52, the memories 64 provide the corresponding phase correction factors which are to be implemented by the phase shifters 56.

Figure 3:
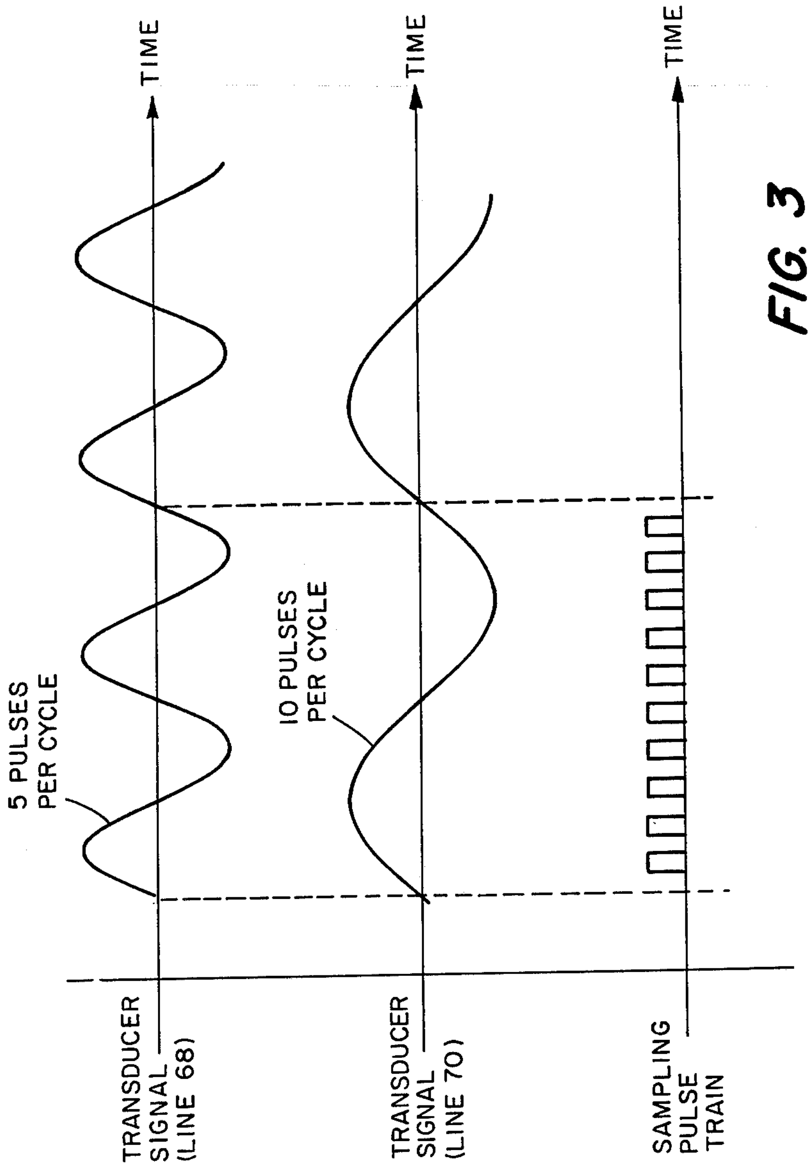
FIG. 3 graphically depicts the frequency provided by a transducer before and after mixing with a reference frequency and also shows a sampling pulse train.

Referring also to FIG. 3, the first and the second graphs portray a situation wherein the mixer 54 of FIG. 2 has reduced the frequency of the transducer signal on line 68 by an exemplary factor of two, it being understood that factors of three, four or other such factor, or the translation of the transducer signal to base band on line 70, may be utilized. The signal on line 68 is portrayed in the first graph of FIG. 3 while the IF signal at the reduced frequency, on line 70, is portrayed in the second graph of FIG. 3. The first two graphs are shown in registration with each other and with a third graph which depicts a set of sampling pulses. In the exemplary situation of FIG. 3, it is seen that five of the sampling pulses occur during one cycle of the signal on line 68 while ten of the sampling pulses occur within one cycle of the signal on line 70. Since, in a sampled data system (as will be described with reference to FIGS. 4 and 5), a quantization in the sampling operation produces temporal increments which are a fraction of the duration of a cycle of the signal being sampled. A finer quantization results in a greater accuracy in the beamforming operation. Accordingly, it is seen that by translating the signal to the lower frequency of the second graph, greater accuracy is obtained than would have been possible by sampling the higher frequency signal portrayed in the first graph.

Figure 4:
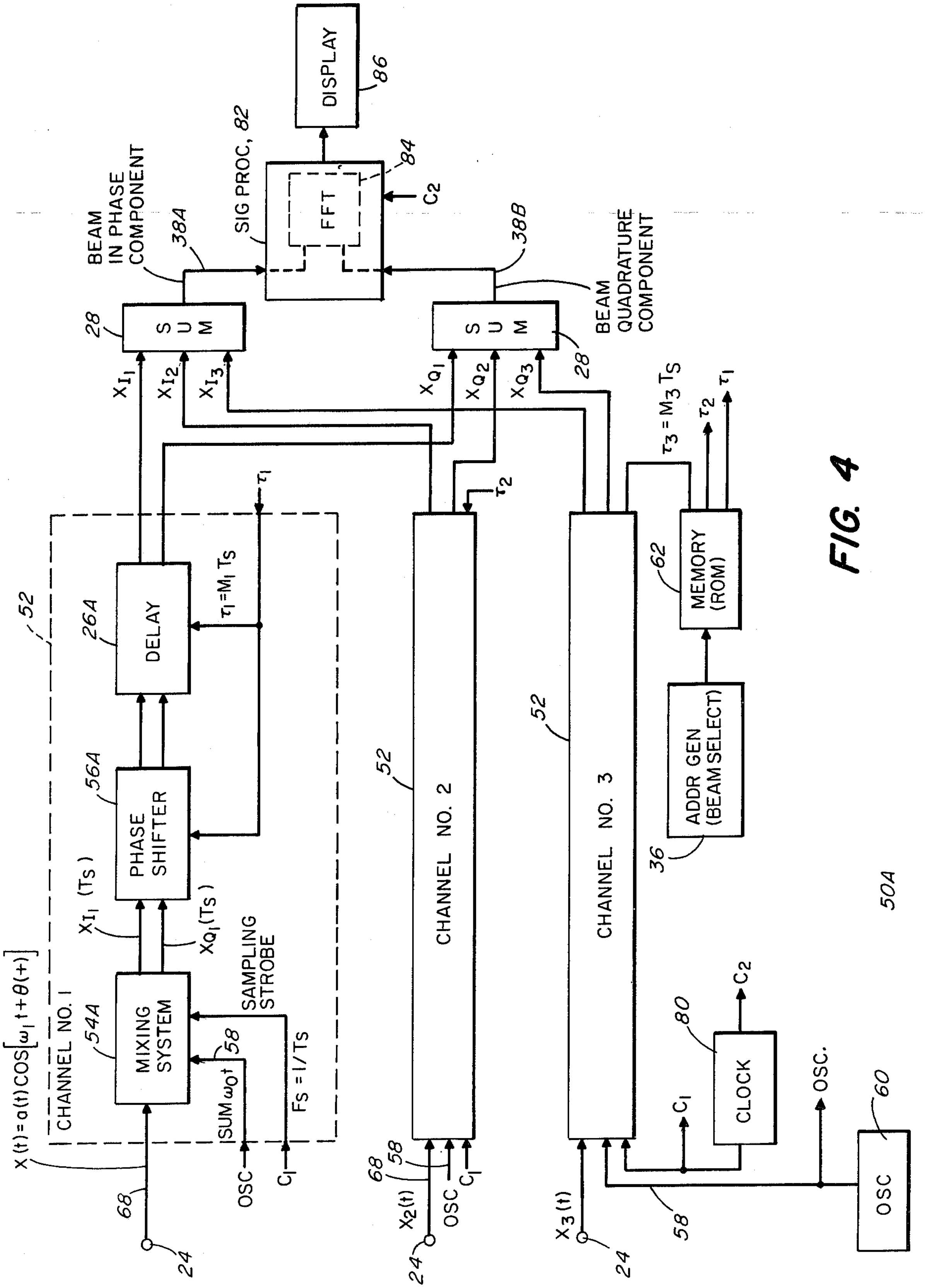
FIG. 4 shows a block diagram of a preferred embodiment of the invention wherein the compensating phase shift is applied by a phase shifter coupled between a mixing system and a delay line in each channel of a three-channel beamformer, the beamformer of FIG. 4 employing inphase and quadrature mixing and sampling of the signals from the respective transducers, the figure also showing an exemplary utilization of the output signals of the beamformer by means of a signal processor employing a fast Fourier transformer (FFT) which may provide a spectral signature of an incoming sound wave, the signature being presented on a display.

Referring now to FIG. 4, there is shown the preferred embodiment of the system 50 which is shown in simplified diagrammatic form in FIG. 2. The embodiment of FIG. 4, identified by the legend 50A, provides for both inphase and quadrature sampling of the transducer signal on line 68 in addition to the mixing operation described previously with reference to the mixer 54. The inphase and quadrature sampling of the transducer signal ensure complete regeneration of the transducer signal upon a translation of the transducer signal to base band as well as to an intermediate frequency. The mixing and sampling operations are accomplished in a mixing system 54A, the phase shifting operation on the inphase and quadrature samples being accomplished by a phase shifter 56A, and the delaying of the inphase and quadrature samples being accomplished by a delay unit 26A. In FIG. 4, the letters I and Q identify the inphase and quadrature components of the sampled signal. Appended to line 68 is a mathematical expression of an exemplary transducer signal, identified by the legend x(t), which is seen to have both an amplitude and phase which may vary as a function of time, t. The subscripts 1, 2, and 3 identify specific ones of the channels 52 in which the corresponding signals are found. The legend Ts identifies the interval of time between successive samples of the transducer signal. The delay increments are in multiples, identified by the legend M, of the intersample interval, Ts. The sample is accomplished in response to strobing signals provided at terminal $C_1$ of a clock 80. The reference signal for the mixing operation is provided along line 58 from the oscillator 60 as was previously seen in FIG. 2. Similarly, the generator 36 and the memory 62 function in FIG. 4 as was taught previously with reference to FIG. 2.

The system 50A further comprises a pair of summers 28, one for summing the inphase component and one for summing the quadrature component of the delayed signals produced by each of the channels 52. By way of example in the utilization of the beamformer of FIG. 4, the inphase and quadrature beam component signals on lines 38A and 38B, respectively, are seen to be applied to an exemplary signal processor 82 having a fast-fourier transformer (FFT) 84. As is well known, an FFT operates with inphase and quadrature signal samples, such as the beam samples of FIG. 4, to provide spectral data thereof, such data being conveniently displayed as a signature pattern on a display 86.

Figure 5:
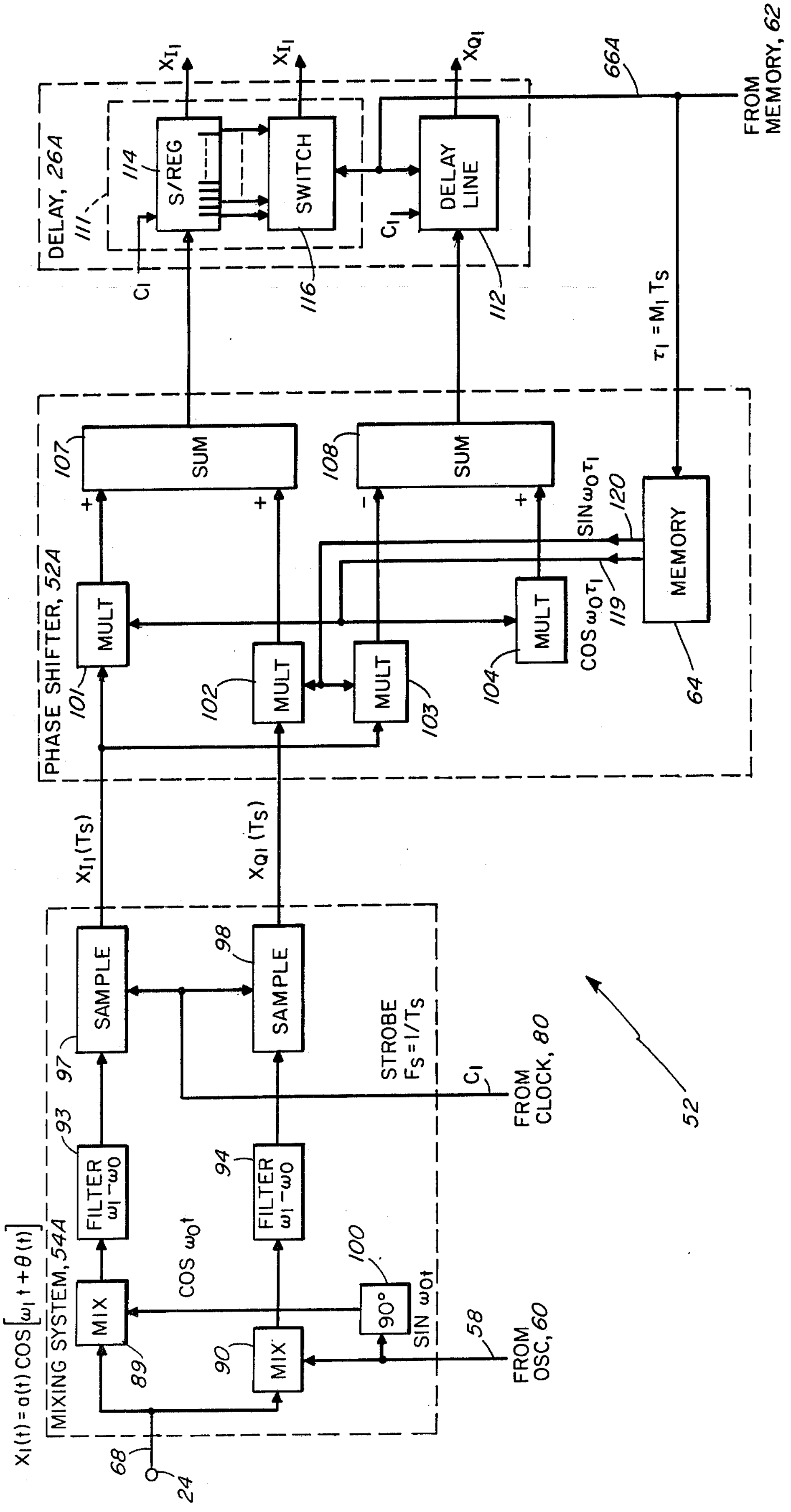
FIG. 5 is a block diagram of the components of the mixing system, the phase shifter, and a delay unit of the first signal processing channel of FIG. 4.

Referring also to FIG. 5, the mixing system 54A is seen to comprise a pair of mixers 89–90, a pair of filters 93–94 for extracting the lower side band of the mixing operation of the mixers 89–90, a pair of sampling units 97–98 which are strobed by the clock 80 for sampling signals provided by the filters 93–94, and a ninety-degree phase shifter 100 for introducing a quadrature relationship between the reference signals applied to the two mixers 89–90. The phase shifter 52A is seen to comprise a set of four multipliers 101–104, a pair of summers 107–108 and the memory 64 which was previously seen in FIG. 2. The delay unit 26A is seen to comprise a pair of delay lines 111–112 each of which comprises a shift register 114 and a selector switch 116 coupled to output terminals of the register 114.

In operation, the channel 52 of FIG. 5 is seen to translate the transducer signal on line 68 to a lower frequency by the mixers 89–90, the lower frequency signal being extracted from the mixers 89–90 by the filters 93–94. Thereupon, the signals provided by the filters 93–94 are sampled by the samplers 97–98 and applied to the multipliers 101–104 such that the inphase component of the signal samples are applied to the multipliers 101 and 103 while the quadrature component of the signal samples are applied to the multiplier 102 and the multiplier 104. Phase factors, identified by a mathematical expressions appended to the lines 119–120 of the memory 64 serve as the phase correction factors which, upon being multiplied by the inphase and quadrature components, result in the summation of a corrective phase factor in the argument of the sinusoidal function as was shown previously by the mathematical expressions of FIG. 2. The products of the multipliers 101–102 are summed together by the summer 107, and the product of the multiplier 103 is subtracted from the product of the multiplier 104 by the summer 108. The sum signals of the summers 107–108, representing respectively the inphase and quadrature components of the transducer signal, are then applied respectively to the shift registers 114 of the delay lines 111–112. In response to clock pulses from terminal $C_1$ of the clock 80, the registers 114 shift the signal samples from cell to cell of the register 114, the switch 116 selecting a sample upon a traversal of a predetermined number of cells of the register 114 to provide the delay designated by the memory 62. The switches 116 and the delay lines 111–112 are operated by the delay command signal on the lines 66A–C which are referred to earlier with reference to FIG. 2. Thereby, the correction factors introduced by the multipliers 101–104 corresponds to the delay imposed on the signal samples by the delay unit 26A. The output signals of the delay unit 26A are then coupled to the input terminals of the summers 28 as described diagrammatically in FIG. 4. The legends appended to the output terminals of the delay unit 26A in FIG. 5 correspond to the legends appended to the output signals of the first of the channels 52 in FIG. 4.

Each of the channels 52 has, therefore, provided for a sampling of a transducer signal subsequent to the reduction of the frequency of the transducer signal, which, in accordance with the teachings of FIG. 3, provides for a finer temporal quantization of the transducer signal by the delay unit 26A resulting in a more accurately formed beam sample by the summers 28 of FIG. 4. It is also noted that the correction factors on lines 119–120 of FIG. 5 are independent of the frequency of the transducer signal on line 68. Furthermore, it is noted that the multipliers 101–104 are capable of operating at the sampling rate, Fs, and, accordingly, do not introduce any bandwidth restrictions to the transducer signal. Thereby, the system 50A of FIG. 4 is capable of operating on the transducer signals without introducing any bandwidth restrictions thereto.

It is understood that the above described embodiment of the invention is illustrative only and that the modifications thereof may occur to those skilled in the art. Accordingly, it is desired that this invention is not to be limited to the embodiment disclosed herein but is to be limited only as defined by the appended claims.

What is claimed is:

1. A beamformer comprising:

mixing means, said mixing means having terminals for receiving signals from the transducers of an array of transducers, said mixing means having terminals for receiving inphase and quadrature reference signals from a source of said inphase and quadrature reference signals, said mixing means mixing said transducer signals with said reference signals to translate said transducer signals to a lower frequency;

phase shifter means coupled to output terminals of said mixer means for applying phase shifts to individual ones of said transducer signals;

delay means coupled to individual ones of said phase shifters for imparting delays to individual ones of said transducer signals in accordance with the times of arrival of a wavefront of radiation upon said transducers of said array, said phase shifts of said phase shifting means being proportional to said delays of said delaying means; and means coupled to said delaying means for summing said transducer signals to form a beam.

2. A beamformer according to claim 1 wherein said mixing means comprises means for sampling individual ones of said transducer signals, samples of said transducer signals being coupled via said phase shifting means to said delay means.

3. A beamformer according to claim 2 wherein the delays of said delaying means are provided in increments of delay which are multiples of an intersample interval of said sampling means.

4. A beamformer according to claim 1 wherein said mixing means includes a source of said reference signals and wherein said phase shifts of said phase shifting means are also proportional to the frequency of said reference signals.

5. A beamformer according to claim 4 further comprising beam selecting means, said beam selecting means providing delay command signals for each direction of said beam, said delay command signals being coupled to said delay means and to said phase shifting means.

6. A beamformer according to claim 5 wherein said phase shifting means comprises a set of multipliers and a memory which stores phase shift scale factors, said memory being coupled to said multipliers and being addressed by said delay command signals.

* * * * *